March 17, 1959  J. C. COUCH  2,878,030
AUTOMOBILE DRAG LINK ADJUSTER
Filed Jan. 25, 1956  2 Sheets-Sheet 1

Joe C. Couch
INVENTOR.

March 17, 1959  J. C. COUCH  2,878,030
AUTOMOBILE DRAG LINK ADJUSTER
Filed Jan. 25, 1956  2 Sheets-Sheet 2
Fig. 2
Fig. 3
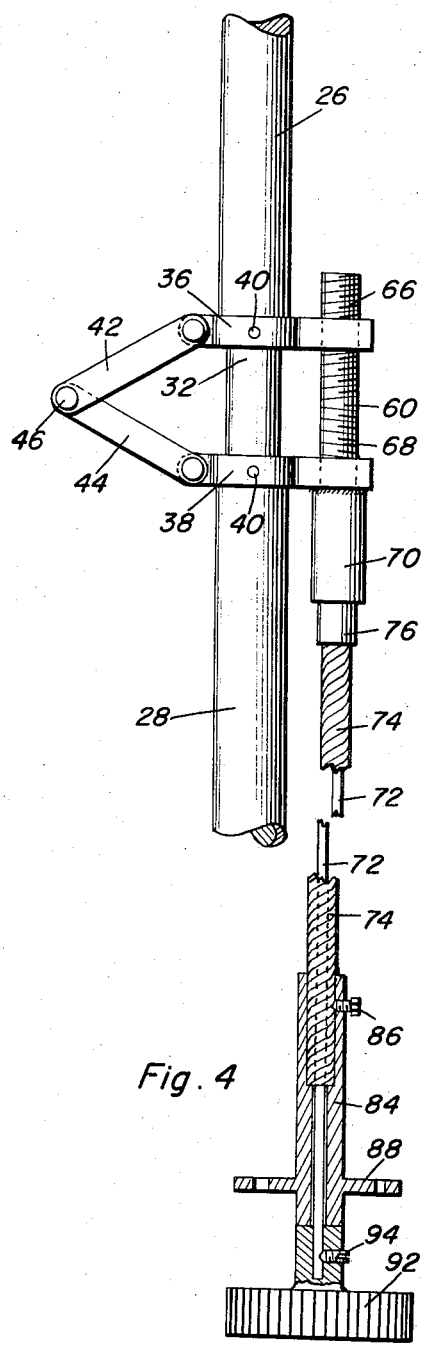
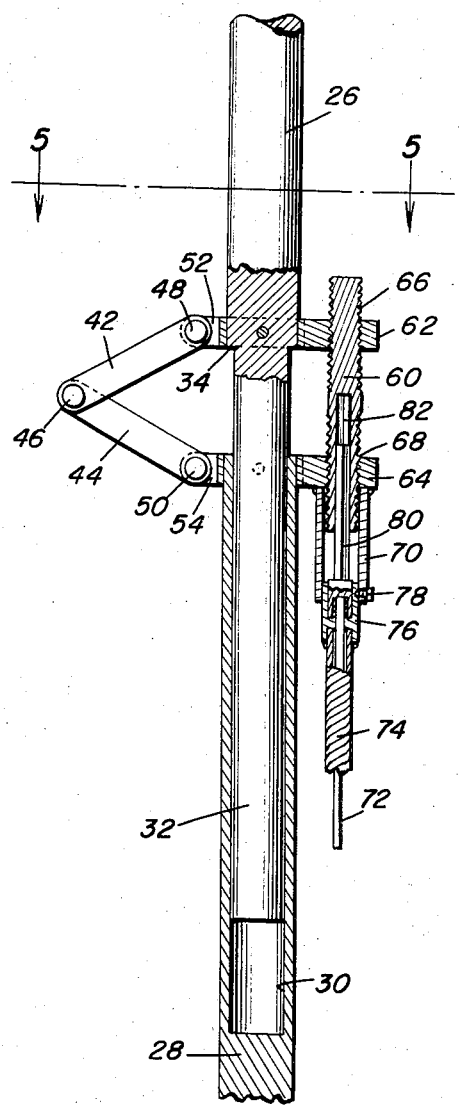
Fig. 4
Joe C. Couch
INVENTOR.
BY *Clarence A. O'Brien*
*and Harvey B. Jackson*
Attorneys

United States Patent Office 2,878,030
Patented Mar. 17, 1959

2,878,030

AUTOMOBILE DRAG LINK ADJUSTER

Joe C. Couch, Vernon, Tex.

Application January 25, 1956, Serial No. 561,245

6 Claims. (Cl. 280—95)

This invention comprises novel and useful improvements in an automobile drag link adjuster, and more particularly relates to an adjusting device in the form of a drag link adapted to be operatively interposed between a steering arm and a steering idler arm of a conventional automotive steering system, for adjusting the relative position of the steering wheel and idler arm with respect to the front wheels of a vehicle.

The principal object of this invention is to provide a mechanism whereby the link of a steering mechanism drag link may be readily adjusted, and during operation of the vehicle from the driver's seat of the same.

A further object of the invention is to provide a mechanism in accordance with the foregoing object whereby the relative position of the steering wheel of the steering system and of the front wheels of the vehicle may be varied as desired.

A further object of the invention is to provide a device which may be readily substituted for the drag link of a conventional automotive steering system to impart a readily controlled adjustability to the link of the drag link of the same.

A further object of the invention is to provide an adjustable drag link having an improved adjustable connection therein whereby the length of the drag link may be accurately and securely varied by small increments as desired.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 2 is a fragmentary view upon an enlarged scale, parts being broken away, and showing the construction of the adjustable drag link and of the link adjusting mechanism applied thereto;

Figure 3 is a detail view of the arrangement of Figure 2 taken in vertical central section through the same;

Figure 4 is a detail view showing in vertical central section, upon an enlarged scale, the remote control means for the drag link adjusting mechanism.

Figure 1:
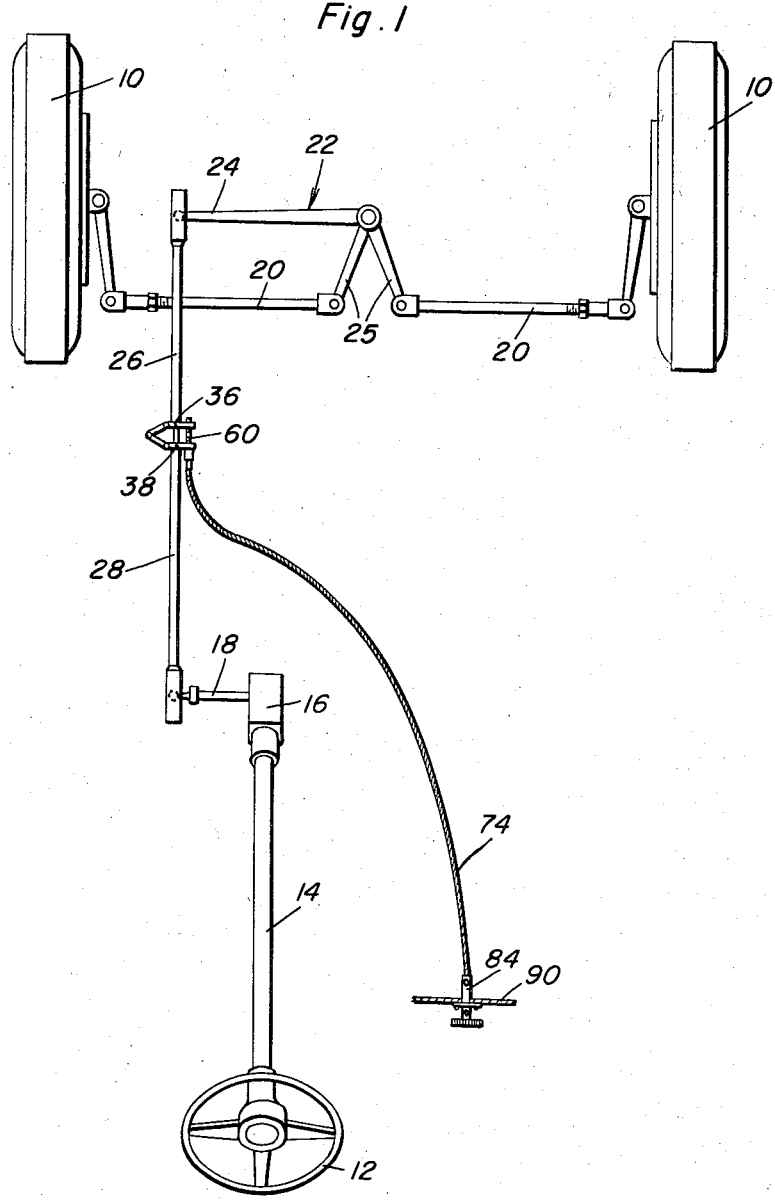
Figure 1 is a somewhat diagrammatic plan view of an automobile steering system showing the principles of this invention applied thereto.
Figure 5:
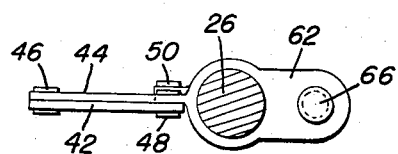
Figure 5 is a horizontal sectional view taken substantially upon the plane indicated by the section line 5—5 of Figure 3.

In modern-day vehicles, owing to the varying conditions imparted by different characters of roads, different uses to which vehicles are put, the varying effects of wind and the like, it frequently becomes desirable and advantageous to adjust the relative position of the steering wheel of the vehicle and the front wheels of the same. In some instances, this adjustment may be made to compensate for the effects of wind upon the steering of the vehicle; and in other instances, to enable the driver to readily see through the steering wheel to view the instruments upon the instrument panel of the vehicle in the normal position of the front wheels of the vehicle and of the steering wheel in synchronization therewith.

In order to provide a durable, safe, easily adjusted and precisely adjusted mechanism for affording the relative adjustment of the position of the steering wheel with respect to the front wheels of the vehicle, the present invention provides a longitudinally adjustable drag link for producing this variation, together with improved means for effecting the longitudinal adjustment of the drag link.

In the accompanying drawings, the front wheels of the vehicle are indicated by the numeral 10 and with the same there is associated the usual steering mechanism or linkage. This latter may conveniently consist of the steering wheel 12 supported by a steering column 14 and having a steering gear assembly 16, the same including a steering arm 18. Connected to the front wheels are a pair of steering links or tie rods 20, which in turn are pivotally connected to a conventional steering idler or third arm indicated generally by the numeral 22. The latter consists of a lever 24 whose end is adapted to be connected to a drag link, and thus to be operated by the steering arm 18 through the steering wheel 12; and a pair of forked arms 25 which are pivotally connected to the tie rods or steering links 20. It will be apparent that for a fixed length of drag link which connects the end of the idler member 24 to the steering arm 18, a fixed relation of the steering wheel 12 with respect to the front wheels 10 is obtained. Obviously, if the length of the drag link is varied, any variation of this fixed relation can be secured, whereby for a given position of the steering wheel, a different position of the front wheels will be obtained, and vice versa.

In accordance with this invention, an adjustable drag link is provided. The same includes a pair of relatively telescoping, axially adjustable sections 26 and 28. As will be seen from Figure 1, the free or outer ends of the sections 26 and 28 are respectively pivotally connected to the idler arm lever 24 and to the steering arm 18 in the usual and conventional manner. However, an adjustable connection is provided between the telescoping ends of the sections in order to provide a positive, accurate and precise control of the relative axial position of the sections, and thus of the length adjustment of the drag link.

As will be apparent from Figure 3, the upper drag link section 28 is provided with a cylindrical bore 30 at its lower end in which is slidably and guidingly received the diametrically reduced end portion 32 of the lower drag link section 26. Where the portion 32 merges with the section 26, there is provided an annular shoulder 34 which may be utilized to abut the end of the section 28 and thus provide a positive stop limiting contraction or reduction in length of the drag link.

Connecting means are provided for securing the two sections together and for limiting movement of the sections away from each other and, if desired, for limiting movement of the sections toward each other. This connecting means comprises a pair of members 36 and 38 preferably in the form of collars which embrace portions of the sections 26 and 28, and which are preferably rigidly secured thereto as by pins or setscrews 40. If desired, these members may be so positioned that they will abut each other upon telescoping movement of the sections toward each other, to thus limit such movement. In other instances, the shoulder 34 previously mentioned may be relied upon for limiting contracting movement, or other means may be provided as set forth hereinafter.

A pair of links 42 and 44 are pivoted to each other as at 46 and have their other ends pivoted, as at 48 and 50, to lugs 52 and 54 which project laterally from the members 36 and 38. It will thus be seen that the links, by their pivotal connection to the members, limit movement of the members, and consequently of the sections, away from each other, and also prevent relative rotation of the members and sections.

An adjusting means is provided, operatively associated with the connecting means, to positively control and adjust the relative positions of the members and of the sections.

In the embodiment illustrating the principles of this invention, such adjusting means may conveniently comprise a screw 60 which is operatively associated with a pair of lateral projections 62 and 64 which are carried by the members 36 and 38, respectively. As illustrated, the screw 60 is provided at its opposite extremities with reversely inclined screw threads 66 and 68 which are received in correspondingly internally threaded bores in the projections 62 and 64 in order that rotation of the screws may simultaneously move the members, and consequently the sections secured thereto, in opposite directions, towards or from each other. However, it is possible for the screw to be provided with a single pitch or thread, whereby the screw may engage the screw threaded bore of one of the members, and be operatively secured to the other member for rotation but against axial movement relative thereto. In either event, it will be evident that upon rotation of the screw, the members and consequently sections may be adjusted longitudinally with respect to each other.

For operating the screw, there is provided an operating means. The latter consists of a sleeve 70 which is welded or otherwise secured to one of the projections, such as the projection 64, and which receives therein one end of the screw member 60. A flexible cable 72 disposed in a flexible housing 74 is provided, the end of the flexible housing being secured as by a connecting bushing 76 in the extremity of the sleeve 70, as by a setscrew 78. The flexible cable extending through the connecting bushing 76 operatively engages a key or driving member 80 which is non-rotatably but axially slidably received within a longitudinal bore 82 of appropriate cross-sectional shape and area, whereby rotation of the flexible cable 72 will result in rotation of the screw member.

From Figures 1 and 4, it will be observed that the other end of the flexible housing 74 is secured in a sleeve 84 as by a setscrew 86, this sleeve having a flange 88 whereby the same may be secured to a portion of the dash 90 of a motor vehicle, or to any other suitable support. The flexible cable 72 previously mentioned extends through the mounting sleeve 84 and is received in and connected to a knurled knob or finger grip member 92, as by a setscrew 94. It will thus be seen that the control knob is disposed remotely from the adjusting and connecting means, and in a convenient position for manipulation by the driver of a vehicle during operation of the latter.

From the foregoing, it will be readily apparent that, by means of the adjusting member 60 and its engagement with the connecting members 36 and 38, the two sections of the adjustable drag link will be securely held in any desired longitudinally adjusted position; and may be easily and readily given a precise and very fine degree of adjustment as to length, when desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An adjustable steering mechanism for vehicles comprising in combination with a steering arm and a steering idler arm, an adjustable drag link comprising a pair of telescoping sections, means directly connecting one section to a steering arm, means directly connecting the other section to an idler arm, means positively but movably connecting said sections together and limiting relative axial movement and preventing relative rotational movement therebetween, adjusting means engaging said last mentioned connecting means for positioning and maintaining said sections in axially adjusted position, operating means for said adjusting means operable from the interior of a vehicle.

2. An adjustable steering mechanism for vehicles comprising in combination with a steering arm and a steering idler arm, an adjustable drag link comprising a pair of telescoping sections, means directly connecting one section to a steering arm, means directly connecting the other section to an idler arm, means positively but movably connecting said sections together and limiting relative axial movement and preventing relative rotational movement therebetween, adjusting means engaging said last mentioned connecting means for positioning and maintaining said sections in axially adjusted position, operating means for said adjusting means operable from the interior of a vehicle, said last mentioned connecting means including a pair of collars each embracing and rigidly secured to one of said sections, a pair of links each having one end of each pivoted to one of said collars and said links having the other end of each pivoted together.

3. The combination of claim 2 wherein said operating means is operatively connected to each of said collars for effecting relative movement thereof axially of said sections.

4. The combination of claim 2 wherein said operating means includes a screw having reversely threaded extremities, said collars each including a portion having an internally threaded bore, the extremities of said screw being each engaged in a bore of one of said collars.

5. The combination of claim 2 wherein said operating means includes a screw having reversely threaded extremities, said collars each including a portion having an internally threaded bore, the extremities of said screw being each engaged in a bore of one of said collars, said operating means further including a rotatable member, said member having an axially slidable but non-rotatable engagement with said screw for rotating the latter.

6. The combination of claim 5 wherein engagement is effected by a spline on said rotatable member engaged in an axial bore in one end of said screw.

References Cited in the file of this patent

UNITED STATES PATENTS

| 1,090,248 | Toepfer | Mar. 17, 1914 |
| 1,727,009 | Floyd | Sept. 3, 1929 |
| 2,186,299 | Klas | Jan. 9, 1940 |
| 2,393,117 | McMullen | Jan. 15, 1946 |

FOREIGN PATENTS

| 157,248 | Germany | Mar. 11, 1904 |
| 2,270 | Great Britain | Jan. 29, 1904 |